United States Patent
Jian et al.

(10) Patent No.: US 12,491,521 B2
(45) Date of Patent: Dec. 9, 2025

(54) BUILT-IN MAGNETIC FILTER MODULE AND CLUTCH SEPARATION SYSTEM

(71) Applicant: Schaeffler Technologies AG & Co. KG, Herzogenaurach (DE)

(72) Inventors: Guangyu Jian, Shanghai (CN); Zhili Xu, Shanghai (CN)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 567 days.

(21) Appl. No.: 17/909,620

(22) PCT Filed: Mar. 6, 2020

(86) PCT No.: PCT/CN2020/078145
§ 371 (c)(1),
(2) Date: Sep. 6, 2022

(87) PCT Pub. No.: WO2021/174521
PCT Pub. Date: Sep. 10, 2021

(65) Prior Publication Data
US 2023/0313845 A1   Oct. 5, 2023

(51) Int. Cl.
| B03C 1/28 | (2006.01) |
| B03C 1/02 | (2006.01) |
| F16B 4/00 | (2006.01) |
| F16D 25/08 | (2006.01) |
| F16D 25/12 | (2006.01) |
| F16D 48/02 | (2006.01) |
| F16L 55/24 | (2006.01) |

(52) U.S. Cl.
CPC ............ B03C 1/286 (2013.01); B03C 1/02 (2013.01); F16B 4/004 (2013.01); F16L 55/24 (2013.01);
(Continued)

(58) Field of Classification Search
CPC .. B03C 1/286; B03C 1/02; B03C 1/30; B03C 2201/18; B03C 2201/30; F16B 4/004;
(Continued)

(56) References Cited

U.S. PATENT DOCUMENTS

| 2,225,205 A | * | 12/1940 | Brooks | ................... B03C 1/286 335/305 |
| 3,637,057 A | * | 1/1972 | Okamoto | ............. F16D 48/066 192/85.48 |

(Continued)

FOREIGN PATENT DOCUMENTS

| CN | 203189565 U | 9/2013 |
| CN | 203470156 U | * 3/2014 |

(Continued)

OTHER PUBLICATIONS

International Search Report and Written Opinion for PCT/CN2020/078145 dated Jun. 28, 2020.

*Primary Examiner* — Liam Royce
(74) *Attorney, Agent, or Firm* — Volpe Koenig

(57) ABSTRACT

A built-in magnetic filter module for filtering the working fluids of clutch separation systems, the built-in magnetic filter module including an air release valve and a magnetic filtration unit including a housing. The housing includes a pipe section providing passage for the working fluid. The magnetic filtration unit is installed on the circumference of the internal wall of said pipe section, and is configured to contact the working fluid and attract metallic foreign matter from within the working fluid.

11 Claims, 2 Drawing Sheets

(52) U.S. Cl.
CPC ...... *B03C 2201/18* (2013.01); *B03C 2201/30* (2013.01); *F16D 2025/081* (2013.01); *F16D 25/12* (2013.01); *F16D 25/14* (2013.01)

(58) Field of Classification Search
CPC .......... F16L 55/24; F16D 25/12; F16D 25/14; F16D 2025/081
See application file for complete search history.

(56) References Cited

U.S. PATENT DOCUMENTS

| | | | | |
|---|---|---|---|---|
| 4,538,582 | A | * | 9/1985 | Wakuta ................. F02M 27/045 |
| | | | | 123/538 |
| 4,728,216 | A | * | 3/1988 | Disborg .................. B61C 15/00 |
| | | | | 29/525 |
| 4,949,828 | A | | 8/1990 | Olsen |
| 2016/0018041 | A1 | * | 1/2016 | Mawby ................... B03C 1/286 |
| | | | | 137/545 |

FOREIGN PATENT DOCUMENTS

| | | | | |
|---|---|---|---|---|
| CN | 104912961 | A | 9/2015 | |
| CN | 205937569 | U | 2/2017 | |
| DE | 19857707 | A1 * | 6/1999 | ............ B60W 10/02 |
| JP | 2000337473 | A | 12/2000 | |
| JP | 2013122415 | A | 6/2013 | |
| KR | 10-1999-0060169 | A | 7/1999 | |
| WO | 2008099005 | A1 | 8/2008 | |
| WO | 2012152382 | A1 | 11/2012 | |

\* cited by examiner

BUILT-IN MAGNETIC FILTER MODULE AND CLUTCH SEPARATION SYSTEM

CROSS-REFERENCE TO RELATED APPLICATIONS

This application is a US National Stage Application of PCT/CN2020/078145, filed on Mar. 6, 2020, the entire disclosure of which is incorporated by reference herein.

TECHNICAL FIELD

The present disclosure relates to the field of clutches, and in particular relates to a type of built-in magnetic filter module and a clutch separation system consisting of said built-in magnetic filter module.

BACKGROUND

Chinese utility model CN205937569U describes a type of clutch master cylinder oil inlet structure that possesses a filter mesh, which consists of the cylinder oil inlet connector, a filter mesh module and a corrugated oil inlet pipe of a CMC (clutch separation cylinder). One end of the filter mesh module is inserted into the interior of the cylinder oil inlet connector, and the other end connects between the oil inlet connector termination face of the cylinder and the corrugated oil inlet pipe. After the working fluid passes from the corrugated oil inlet pipe and undergoes filtration by the filter mesh module, it passes through the gap between the filter mesh module and cylinder oil inlet connector wall to enter the CMC.

The following drawbacks exist with the prior art mentioned above:

The filter mesh module is installed in a position where the cylinder oil inlet connector and low pressure hose of the CMC connect, but in an electronic clutch an MCA (modular clutch actuator) is used to replace the CMC, and that type of filter mesh module is no longer applicable.

Filter mesh modules rely on a filter mesh to achieve filtration, but since system efficiency must be considered the pores of the filter mesh cannot be too small, and this leads to fine metallic foreign matter smaller than the size of the pores not being filtered out.

During the process of the working fluid flowing back to the fluid reservoir from the clutch master cylinder, the foreign matter filtered out by the filter mesh module may flow back with the working fluid.

SUMMARY

The aim of the present disclosure is to overcome or at least alleviate the drawbacks currently present in the above-mentioned prior art, by providing a type of built-in magnetic filter module for use with clutch separation systems and clutch separation systems that include said built-in magnetic filter modules that exhibits excellent filtration and that has a wide range of applications.

A type of built-in magnetic filter module is provided, for use in filtering the working fluids of clutch separation systems, said built-in magnetic filter module comprising the air release valve of said clutch separation system and a magnetic filtration unit, said air release valve possessing a housing, said housing consisting of a pipe section providing passage for the working fluid, said magnetic filtration unit being installed on the circumference of the internal wall of said pipe section, and said magnetic filtration unit being capable of coming into contact with said working fluid and attracting metallic foreign matter from within said working fluid.

In at least one embodiment, said built-in magnetic filter module includes a press fit member, said press fit member being installed on the circumference of the internal wall, said circumference of the internal wall possesses a first step, and said first step and said press fit member positioning the magnetic filtration unit according to the flow direction of the working fluid flowing within said housing. Alternatively, said built-in magnetic filter module includes a spring clip, said spring clip being for the purpose of fixing said magnetic filtration unit within said housing.

In at least one embodiment, the circumference of the internal wall possesses at least a first chamfer, said first chamfer being located to the exterior of the first step in the flow direction, the inner diameter $D3$ of the part of the pipe section located above and external to the first chamfer in the flow direction being greater than the inner diameter $D2$ of the part to the exterior of the first step and located to the interior of the first chamfer, the end of said press fit member that is adjacent to the magnetic filtration unit possessing a guide chamfer, and the slope of said guide chamfer being in the same direction as that of the first chamfer.

In at least one embodiment, said press fit member is cylindrical, the circumference of the outer wall of said press fit member possessing multiple annular flanges in an arrangement at intervals along the flow direction, and said press fit member having an interference fit with said pipe section via said multiple annular flanges.

Alternatively, the outer surface of the press fit member may be disposed such that it has a screw structure, and a screw structure is provided in the circumference of the internal wall provided for the press fit member which matches the screw structure of the press fit member; after the press fit member is installed, the press fit member forms a screw connection structure between the inner walls. Alternatively, the connection between the press fit member and the circumference of the internal wall is by clipping.

In at least one embodiment, the housing of said press fit member and of said air release valve are both made of plastic, the hardness of the plastic used for making said air release valve being greater than the hardness of the plastic used to make said press fit member.

In at least one embodiment, the radial inside of said magnetic filtration unit and said press fit member possess a channel through which the working fluid can flow, and the radial size of the part of said channel radially inside said magnetic filtration unit is greater than or equal to the radial size of the part of said channel radially inside said press fit member.

In at least one embodiment, said air release valve possesses a high pressure hose connector, said pipe section consisting of a first pipe section connecting with the high pressure hose connector, said magnetic filtration unit and press fit member connecting with said first pipe section.

In at least one embodiment, said magnetic filtration unit is cylindrical, said magnetic filtration unit and the circumference of the internal wall of the housing having a clearance fit or a contact fit.

A type of clutch separation system is also provided, comprising of any aspect of the above-mentioned built-in magnetic filter module technical scheme.

In at least one embodiment, said clutch separation system also consists of:

a clutch master cylinder or modular clutch actuator connected to one end of said housing; and an auxiliary clutch cylinder connected to the other end of said housing.

The above-described technical scheme possesses at least the following advantages:

the fine metallic foreign matter within the working fluid flowing from the reservoir towards the clutch separation system and flowing from the clutch separation system towards the reservoir can be attracted by the magnetic filtration unit; furthermore, compared to a filter mesh type filtration device, said built-in magnetic filter module is basically incapable of blocking the flow of the working fluid and therefore has a relatively small effect on the flow of the working fluid, and regardless of whether manual clutches or electronic clutches are concerned, both are capable of using said built-in magnetic filter module.

The above technical scheme is also capable of possessing the following advantages:

A first step and press fit member position the magnetic filtration unit in the flow direction, thereby simplifying the magnetic filtration unit positioning structure.

Provision of annular flanges allows the interference fit surface area to be appropriately reduced.

Locating the magnetic filtration unit in the more spacious first pipe section makes operation more convenient and the effect on the flow of the working fluid is smaller.

The radial size of the part of the channel radially inside said magnetic filtration unit is greater than or equal to the radial size of the part radially inside said press fit member. In this manner, when the magnetic filtration unit attracts metallic foreign matter, the flow of the working fluid is basically not affected.

DESCRIPTION OF LABELING OF APPENDED DRAWINGS 1 air release valve, 11 first pipe section, 11a first step, 11b first chamfer, 12 second pipe section, 13 high pressure hose connector, 14 CSC connector, 15 air release vent, 2 magnetic filtration unit, 3 press fit member, 31 guide chamfer, 32 annular flanges.

DETAILED DESCRIPTION

Exemplary embodiments of the present disclosure will be described below with reference to the drawings.

Figure 1A:
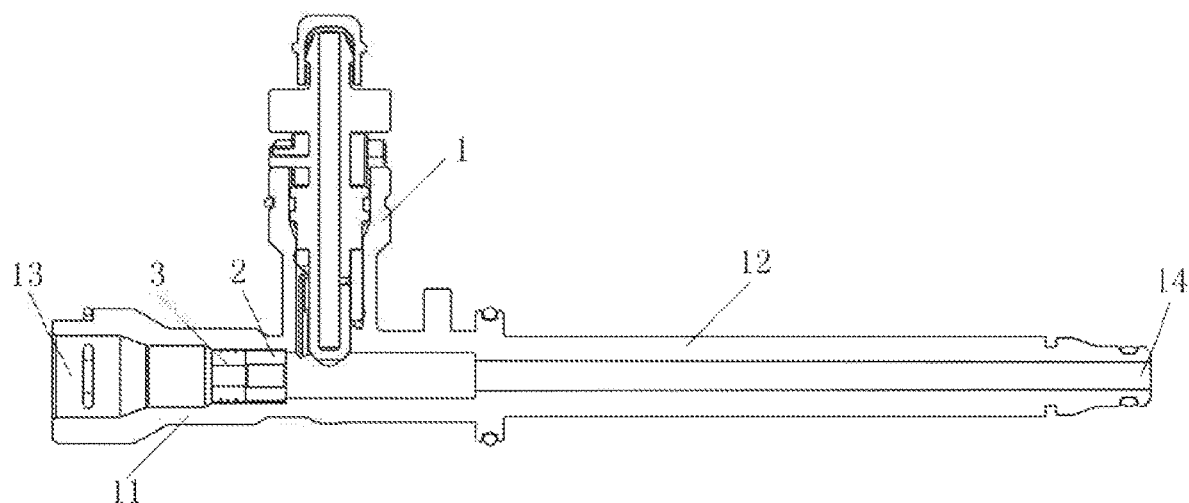
FIG. 1a is a sectional view of the built-in magnetic filter module of the present disclosure.
Figure 1B:
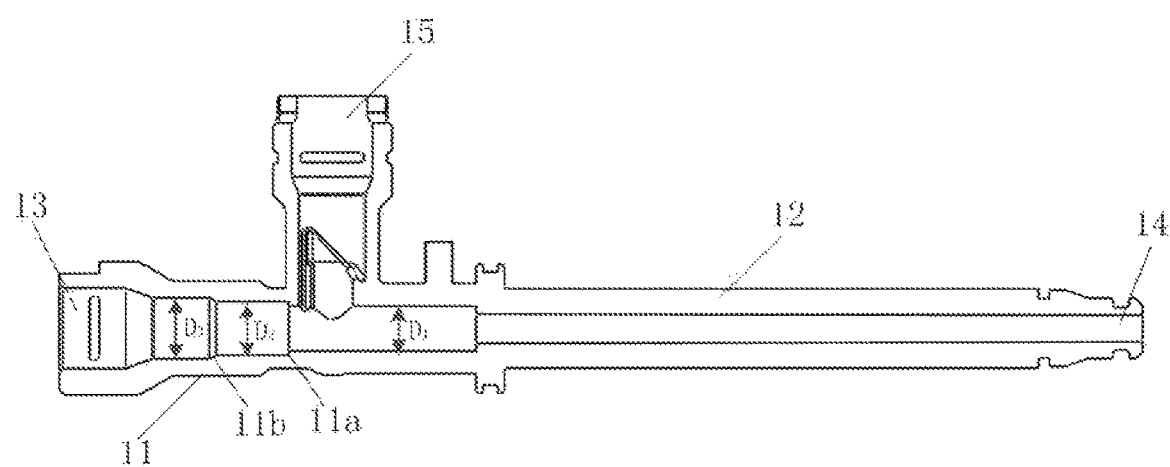
FIG. 1b is a sectional view of the housing of the air release valve.

As shown in FIG. 1a and FIG. 1b, the present disclosure provides a type of built-in magnetic filter module for use with clutch separation systems, said built-in magnetic filter module comprising an air release valve 1 of the clutch separation system, a magnetic filtration unit 2 and a press fit member 3. The purpose of the air release valve 1 is to purge air from within the clutch separation system, and it comprises a housing that consists of a pipe section provided for the flow of working fluid, there being an air release vent 15, a high pressure hose connector 13 and an auxiliary clutch cylinder connector 14 provided on the housing, the aforementioned pipe section includes a first pipe section 11 connecting with the high pressure hose connector 13 and a second pipe 12 connecting with the auxiliary clutch cylinder 14. The housing of the air release valve 1 is made of a non-magnetizable material, for instance plastic.

The high pressure hose connector 13 is for connecting a high pressure hose, the high pressure hose is connected with the clutch master cylinder, and the auxiliary clutch cylinder connector 14 is for direct connection to the auxiliary clutch cylinder. The size of the inner diameter of the high pressure hose connector 13 is greater than the size of the inner diameter of the auxiliary clutch cylinder connector 14, so when the high pressure hose connector 13 is connected with the high pressure hose it is effectively the female connector, and when the auxiliary clutch cylinder connector 14 is connected with the auxiliary clutch cylinder it is effectively the male connector.

The magnetic filtration unit 2 connects with the circumference of the internal wall of the housing of the air release valve 1, the magnetic filtration unit 2 is able to come into contact with the working fluid within the air release valve 1, and when working fluid flows through the air release valve 1, the metallic foreign matter within the working fluid is attracted by the magnetic filtration unit 2, thereby purifying the working fluid flowing towards the clutch separation system and flowing back towards the reservoir.

In this manner, the fine metallic foreign matter within the working fluid flowing from the reservoir towards the clutch separation system and flowing from the clutch separation system towards the reservoir can be attracted by the magnetic filtration unit 2; furthermore, compared to a filter mesh type filtration device, said built-in magnetic filter module basically cannot block the flow of the working fluid, and therefore has a relatively small effect on the flow of the working fluid, and both manual clutches and electronic clutches, can use said built-in magnetic filtration unit.

Metallic foreign matter within the working fluid may lead to erosion of sealing members, and in view of this, the built-in magnetic filter module is of major importance.

To explain, "flow direction" for the purposes of this text includes the flow direction of working fluid from the high pressure hose connector 13 towards the auxiliary clutch cylinder connector 14 and the flow direction from the auxiliary clutch cylinder connector 14 towards the high pressure hose connector 13. "Outwards in the flow direction" of the first pipe section 11a refers to the side of the flow direction closer to the high pressure hose connector 13. "Outwards in the flow direction" of the second pipe section 11b refers to the side of the flow direction closer to the auxiliary clutch cylinder connector 14.

The circumference of the internal wall of the first pipe section 11 possesses a first step 11a and a first chamfer 11b, the first step 11a and first chamfer 11b being formed around the entire circumference of the internal wall of the first pipe section 11. The first chamfer 11b and the first step 11a are in an arrangement at intervals in the flow direction, the first chamfer 11b being in a position external to the first step 11a in the flow direction, and therefore the first chamfer 11b is closer to the high pressure hose connector 13 than the first step 11a.

The size of the inner diameter D3 of the part of the first pipe section 11 positioned external to the first chamfer 11b in the flow direction is greater than the size of the inner diameter D2 of the part external to the first step 11a positioned internal to the first chamfer 11b. The size of the inner diameter D2 of the part of the pipe section 11 positioned external to the first step 11*a* in the flow direction and positioned to the interior of the first chamfer 11*b* is greater than the size of the inner diameter D1 of the part positioned internal to the first step 11*a*.

Figure 3:
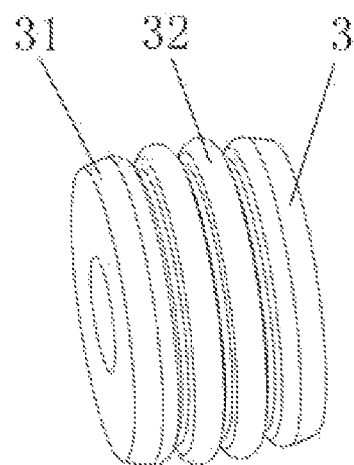
FIG. 3 is a three-dimensional structural representation of the press fit member.

As is shown in FIG. 1*a*, FIG. 1*b* and FIG. 3, the press fit member 3 connects with the circumference of the internal wall of the air release valve 1, and specifically can connect with the circumference of the internal wall of the first pipe section 11. The press fit member 3 may be cylindrical, the circumference of the outer wall of the press fit member 3 possessing multiple annular flanges 32 provided at intervals along the flow direction. The two ends of the press fit member 3 may possess guide chamfers 31, the guide chamfers 31 forming a fit with the first chamfer 11*b*, and as such the direction of slope of the guide chamfer 31 and the first chamfer 11*b* is the same, and the angle of slope of these two may also be the same.

When the press fit member 3 is installed in the air release valve 1, the guide chamfer 31 of the press fit member 3 close to the magnetic filtration unit 2 comes close to the first chamfer 11*b* before other parts of the press fit member 3, the first chamfer 11*b* and the guide chamfer 31 having the effect of guiding the press fit member 3, while the wider space of the first chamfer 11*b* of the first pipe section 11 to the exterior in terms of flow direction is advantageous for the installation of the press fit member 3.

The ends of the press fit member 3 close to the magnetic filtration unit 2 and away from the magnetic filtration unit 2 both possess guide chamfers 31, whereby the press fit member 3 possesses greater utility, either of the two ends acting as the front end in the direction of insertion and having a guiding effect on the press fit member 3.

The press fit member 3 may for instance be made of plastic, and the hardness of the press fit member 3 may be less than the hardness of the housing of the air release valve 1. The press fit member 3 may form an interference fit with the air release valve 1, the annular flanges 32 being in an arrangement that suitably reduces the surface area of the interference fit.

The first step 11*a* and press fit member 3 position the magnetic filtration unit 2 in the flow direction, thereby simplifying the magnetic filtration unit 2 positioning structure.

Alternatively, the outer surface of the press fit member 3 may be disposed such that it has a screw structure, and a screw structure is provided on the circumference of the internal wall provided for the press fit member 3 which matches the screw structure of the press fit member 3; after the press fit member 3 is installed, a screw connection structure is formed between the press fit member 3 and the circumference of the internal wall. Alternatively, the press fit member is snap fitted with the circumference of the internal wall. In another embodiment, another positioning method may be adopted, for instance a magnetic filtration unit 2 may be disposed in the pipe section of the air release valve 1 that does not possess a first step 11*a* (for instance the second pipe section 12), and be positioned using two press fit members 3.

By locating the magnetic filtration unit 2 in the more spacious first pipe section 11, operation is more convenient and the effect on the flow of the working fluid is smaller.

Figure 2:
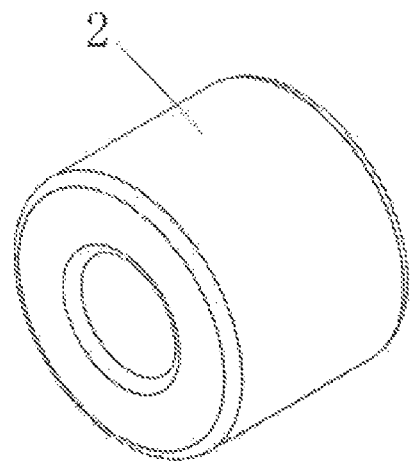
FIG. 2 is a three-dimensional structural representation of the magnetic filtration unit.

As is shown in FIG. 1*a*, FIG. 1*b* and FIG. 2, the magnetic filtration unit 2 may be cylindrical. The magnetic filtration unit 2 may form a contact fit or a clearance fit with the circumference of the internal wall of the air release valve 1, and when a contact fit is formed by the magnetic filtration unit 2 and the circumference of the internal wall of the air release valve 1, the magnetic filtration unit 2 is secured immovably in the radial direction (perpendicular to the flow direction); when the magnetic filtration unit 2 forms a clearance fit with the circumference of the internal wall of the air release valve 1, the magnetic filtration unit 2 is capable of slight play in the radial direction, and said play basically does not affect attraction of metallic foreign matter and the flow of the working fluid.

The inner side of the magnetic filtration unit 2 radially and the inner side of the press fit member 3 radially possess a channel through which the working fluid can flow, and the radial size of the part of said channel radially inside said magnetic filtration unit 2 is greater than or equal to the radial size of the part of said channel radially inside said press fit member 3. If the bore of the magnetic filtration unit 2 and the bore of the press fit member 3 are both round holes, the size of the bore of the aperture of the magnetic filtration unit 2 may be greater than or equal to the bore of the aperture of the press fit member 3. In this manner, when the magnetic filtration unit 2 attracts metallic foreign matter, the flow of the working fluid is basically unaffected.

Specifically, said magnetic filtration unit 2 may be a magnet.

The present disclosure also provides a clutch separation system that possesses the aforementioned built-in magnetic filter module, said clutch separation system also comprising a clutch master cylinder or a modular clutch actuator connecting to one end of the housing of the air release valve 1, and an auxiliary clutch cylinder connecting to the other end of the housing.

Naturally, the present disclosure is not limited to the above-mentioned embodiments, and a person skilled in the art could make various modifications to the above-mentioned embodiments of the present disclosure guided by the present disclosure without departing from the scope of the present disclosure.

The invention claimed is:

1. A built-in magnetic filter module for filtering working fluids of a clutch separation system, said built-in magnetic filter module comprising:
    an air release valve of said clutch separation system; and
    a magnetic filtration unit, wherein said air release valve includes a housing having an air release vent and a pipe section providing passage for the working fluid, said magnetic filtration unit being installed on a circumference of an internal wall of said pipe section, said magnetic filtration unit being configured to contact said working fluid and attract metallic foreign matter from within said working fluid.

2. The built-in magnetic filter module according to claim 1, wherein, said built-in magnetic filter module comprises a press fit member installed on the circumference of the internal wall, said circumference of the internal wall possessing a first step, said first step and said press fit member configured to position the magnetic filtration unit according to a flow direction of the working fluid flowing within said housing.

3. The built-in magnetic filter module according to claim 2, wherein, the circumference of the internal wall includes at least a first chamfer positioned away from the first step in the flow direction, an inner diameter of a part of the pipe section positioned away from the first chamfer in the flow direction being greater than an inner diameter of a part positioned away from the first step and positioned inside of the first chamfer, an end of said press fit member adjacent to the magnetic filtration unit possessing a guide chamfer having the same direction of slope as the first chamfer.

4. The built-in magnetic filter module according to claim 2, wherein, said press fit member is cylindrical, a circumference of an outer wall of said press fit member includes multiple annular flanges at intervals along the flow direction, said press fit member having an interference fit with said pipe section via said multiple annular flanges; or, said press fit member possesses a screw thread on the circumference of its outer wall, and a corresponding screw thread structure is provided on the circumference of the internal wall, said press fit member forming a screw connection with the circumference of the internal wall; or, the connection between the press fit member and the circumference of the internal wall is provided via clipping.

5. The built-in magnetic filter module according to claim 2, wherein, the press fit member and the housing of said air release valve are both made of plastic, a hardness of the plastic used for making the housing of said air release valve being greater than a hardness of the plastic used to make said press fit member.

6. A built-in magnetic filter module for filtering working fluids of a clutch separation system, said built-in magnetic filter module comprising:
   an air release valve of said clutch separation system; and
   a magnetic filtration unit,
   wherein said air release valve includes a housing having a pipe section providing passage for the working fluid, said magnetic filtration unit being installed on a circumference of an internal wall of said pipe section, said magnetic filtration unit being configured to contact said working fluid and attract metallic foreign matter from within said working fluid;
   wherein said built-in magnetic filter module comprises a press fit member installed on the circumference of the internal wall, said circumference of the internal wall possessing a first step, said first step and said press fit member configured to position the magnetic filtration unit according to a flow direction of the working fluid flowing within said housing, and
   wherein, a channel is defined radially inside of said magnetic filtration unit and said press fit member through which the working fluid can flow, a radial dimension of a part of said channel radially inside said magnetic filtration unit is greater than or equal to a radial dimension of the part of said channel radially inside said press fit member.

7. The built-in magnetic filter module according to claim 2, wherein, said air release valve is configured to be provided between a clutch master cylinder and an auxiliary clutch cylinder, said air release valve possessing a high pressure hose connector, said pipe section including a first pipe section configured to connect with the high pressure hose connector, and said magnetic filtration unit and said press fit member connecting with said first pipe section.

8. The built-in magnetic filter module according to claim 1, wherein, said magnetic filtration unit is cylindrical, and a clearance or contact fit is defined between said magnetic filtration unit and the circumference of the internal wall of the housing.

9. A clutch separation system, comprising the built-in magnetic filter module according to claim 1.

10. The clutch separation system according to claim 9, wherein, said clutch separation system further comprises: a clutch master cylinder or a modular clutch actuator connected to a first end of said housing; and an auxiliary clutch cylinder connected to a second end of said housing.

11. The built-in magnetic filter module according to claim 1, wherein said built-in magnetic filter module comprises a spring clip configured to fix said magnetic filtration unit within said housing.

* * * * *